United States Patent
Satran et al.

[11] Patent Number: 5,904,449
[45] Date of Patent: May 18, 1999

[54] CUTTING INSERT AND CUTTING TOOL USING THE SAME

[75] Inventors: Amir Satran, Kfar Vradim; Yuri Men, Haifa, both of Israel

[73] Assignee: Iscar Ltd., Migdal Tefen, Israel

[21] Appl. No.: 08/915,694

[22] Filed: Aug. 21, 1997

[30] Foreign Application Priority Data

Aug. 22, 1996 [IL] Israel .......................................... 119114

[51] Int. Cl.$^6$ ........................................................ B26D 1/12
[52] U.S. Cl. ................ 407/59; 407/40; 407/42; 407/47; 407/51; 407/53; 407/61; 407/113; 408/224
[58] Field of Search ................... 407/34, 40, 42, 407/47, 51, 53, 59, 61, 113; 408/224, 713; 409/287

[56] References Cited

U.S. PATENT DOCUMENTS

| | | | |
|---|---|---|---|
| 2,549,251 | 4/1951 | Skelton | 144/221 |
| 4,182,587 | 1/1980 | Striegl | 407/61 |
| 4,789,273 | 12/1988 | Wiacek et al. | 407/42 |
| 4,790,693 | 12/1988 | Koblesky | 407/35 |
| 5,083,887 | 1/1992 | Dotany . | |
| 5,147,158 | 9/1992 | Riviere . | |
| 5,425,603 | 6/1995 | Dutschke | 407/40 |
| 5,542,793 | 8/1996 | Deiss et al. | 407/35 |
| 5,622,460 | 4/1997 | Satran et al. . | |

FOREIGN PATENT DOCUMENTS

38 00 747 A1   7/1989   Germany .
41 37 230 A1   5/1993   Germany .

*Primary Examiner*—Andrea L. Pitts
*Assistant Examiner*—Toan Le
*Attorney, Agent, or Firm*—Pennie & Edmonds LLP

[57] ABSTRACT

A cutting tool including a toolholder for releasably receiving a plurality of quadrilateral cutting inserts in which adjacent cutting inserts are partially nested for their greater compaction and whereby their operative cutting edges overlap so as to present an effectively continuous cutting edge. The cutting inserts each having upper and lower surfaces, a side surface associated with a cutting edge and a pair of opposite side surfaces directed transversely thereto, the insert having an upper and base insert edges defined by the respective intersections of the upper and lower surfaces and a first of the opposite side surfaces, at least one of the surfaces associated with the insert base edge having a recessed portion of varying depth relative to the upper insert edge along imaginary lines parallel to the major cutting edge in a bottom view of the cutting insert, the depth being maximal remote from the major cutting edge.

17 Claims, 8 Drawing Sheets

CUTTING INSERT AND CUTTING TOOL USING THE SAME

FIELD OF THE INVENTION

The invention generally relates to cutting tools with an extended cutting edge constituted by two or more overlapping operative cutting edges and quadrilateral cutting inserts for use therewith.

BACKGROUND OF THE INVENTION

In U.S. Pat. No. 5,083,887 to Dotany, there is illustrated and described an end mill with one or more helical arrays of radially mounted quadrilateral cutting inserts. Along each helical array, the cutting inserts are so disposed that a radially directed upper edge of a cutting insert overlaps a radially directed upper edge of an adjacent cutting insert whilst their operative cutting edges axially overlap to constitute a fully effective cutting edge during a cutting operation.

Figure 1:
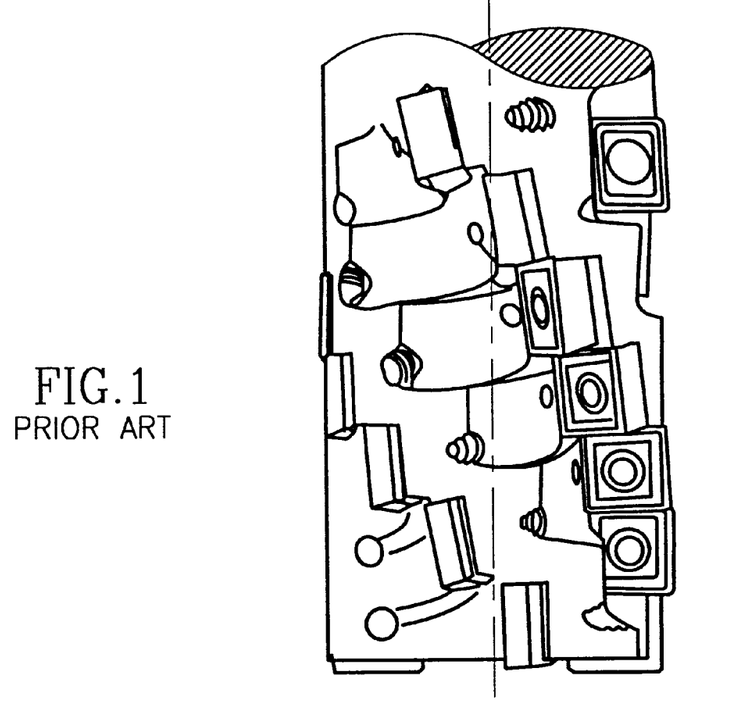
FIGS. 1 and 2 are respectively side and front views of a conventional right hand end mill with cutting inserts stepping up along a left hand helix.

End mills of this type require that a cutting insert's lower surface is clear of an inner upper insert corner remote from its adjacent cutting insert's operative cutting edge. Thus, in an exemplary right hand end mill having cutting inserts stepping up along a left hand helix shown in FIGS. 1 and 2 corresponding to FIGS. 1 and 3 of US '887, a cutting insert's lower surface clears the inner upper insert corner remote from the trailing end of its adjacent cutting insert's operative cutting edge.

Figure 2:
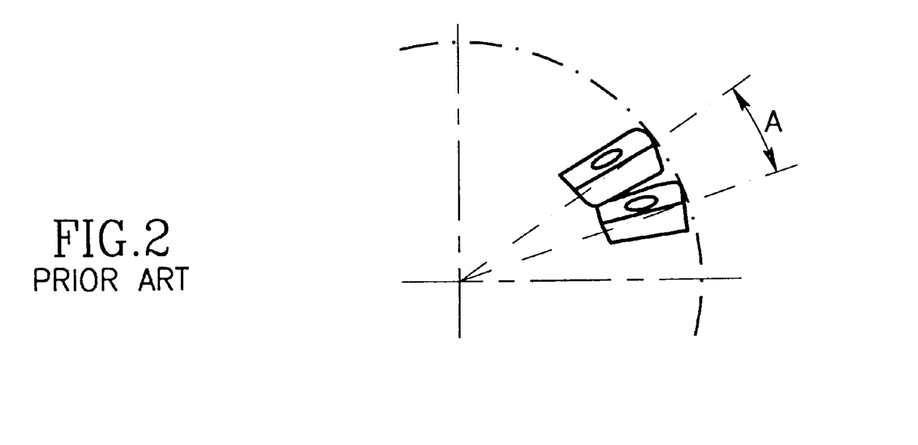
Figure 3:
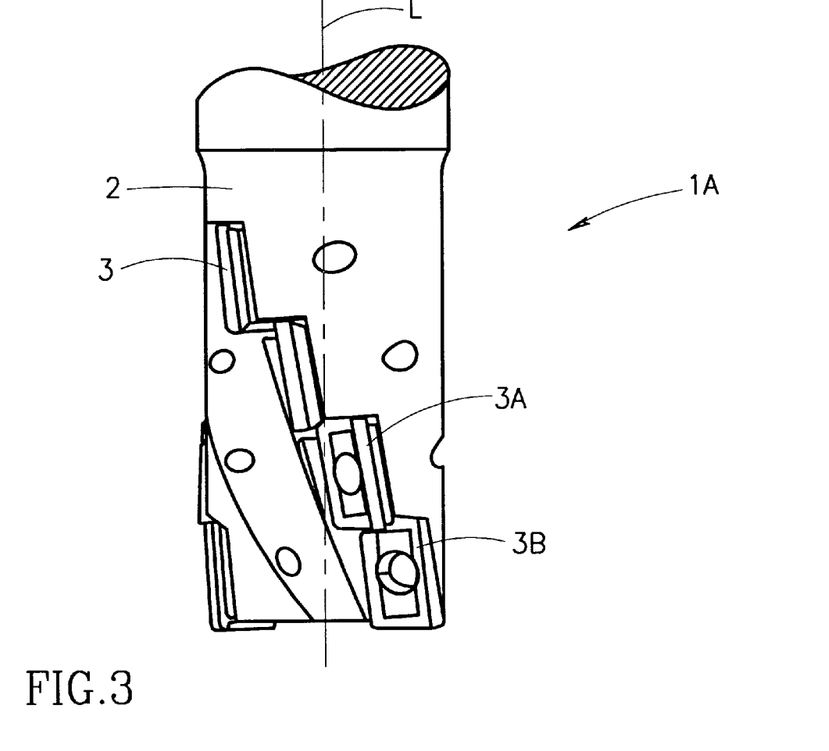
FIG. 3 is a side view of a right hand end mill of the present invention with cutting inserts stepping up along a left hand helix.

This limiting feature in an end mill having a relatively small diameter or adapted for use with cutting inserts whose dimensions are relatively large relative to its diameter results in a large insert to insert angular pitch denoted A in FIG. 2 causing inter alia noisy and interrupted cutting.

SUMMARY OF THE INVENTION

In accordance with a first aspect of the present invention, there is provided a cutting tool comprising a toolholder for releasably receiving at least two adjacent quadrilateral cutting inserts, each cutting insert having upper and lower surfaces, a side surface associated with an operative cutting edge and a pair of opposite side surfaces directed transversely thereto, the insert having a base edge defined by the intersection of associated portions of the lower surface and a first of said opposite side surfaces, at least one of said associated portions being recessed so as to receive therein an upper portion of the second of said opposite side surfaces of the adjacent cutting insert, whereby said upper portion of the adjacent cutting insert is nested therewithin and the operative cutting edges of the cutting inserts overlap so as to present an effectively continuous cutting edge.

The proportion of the upper portion of an adjacent cutting insert's side surface which is nested depends inter alia on the type of cutting tool. Thus, in the case of a milling cutter with radially mounted cutting inserts, a radially inward part of a radially directed upper edge is nested. Against this, in the case of a broach, a virtually entire upper portion is nested.

The present invention makes use of recessed portions in cutting inserts for their closer packing in a cutting tool. In the case of a milling cutter of the above type, such closer packing facilitates smaller insert to insert angular pitches bringing the operative cutting edges of its cutting inserts to a closer true helix, thereby providing for smoother cutting In addition, the arrangement of the present invention facilitates the use of negative cutting inserts, for example, as illustrated and described in commonly owned U.S. Pat. No. 5,622,460.

In accordance with a second aspect of the present invention, there is provided a quadrilateral cutting insert comprising upper and lower surfaces, a side surface associated with a cutting edge and a pair of opposite side surfaces directed transversely thereto, the insert having upper and base edges defined by the respective intersections of said upper and lower surfaces and a first of said opposite side surfaces, at least one of the surfaces associated with said base edge having a recessed portion of varying depth relative to said upper edge along imaginary lines parallel to said cutting edge in a bottom view of the cutting insert, said depth being maximal remote from said cutting edge.

By virtue of this design, cutting inserts facilitate maximum compaction without unduly reducing the supporting area of a cutting insert's lower surface.

In a cutting insert, its recessed portion can be provided either as a step-like feature in a lowermost portion of the first of its opposite side surfaces or, alternatively, as an indentation in its lower surface. This latter design is particularly suitable for a cutting insert with a sloping cutting edge.

The provision of a step-like recess in the lowermost portion of a cutting insert's side surface has been described in U.S. Pat. No. 5,147,158 to Riviere, however, for the purpose of defining a fracture zone for controlling the location of breakage in the event of insert breakage whereby the insert lower portion effectively constitutes an integrally formed shim.

BRIEF DESCRIPTION OF THE DRAWINGS

For a better understanding of the present invention and to show how the same can be carried out in practice, reference will now be made to the accompanying drawings, in which.

DETAILED DESCRIPTION OF PREFERRED EMBODIMENTS

Figure 5:
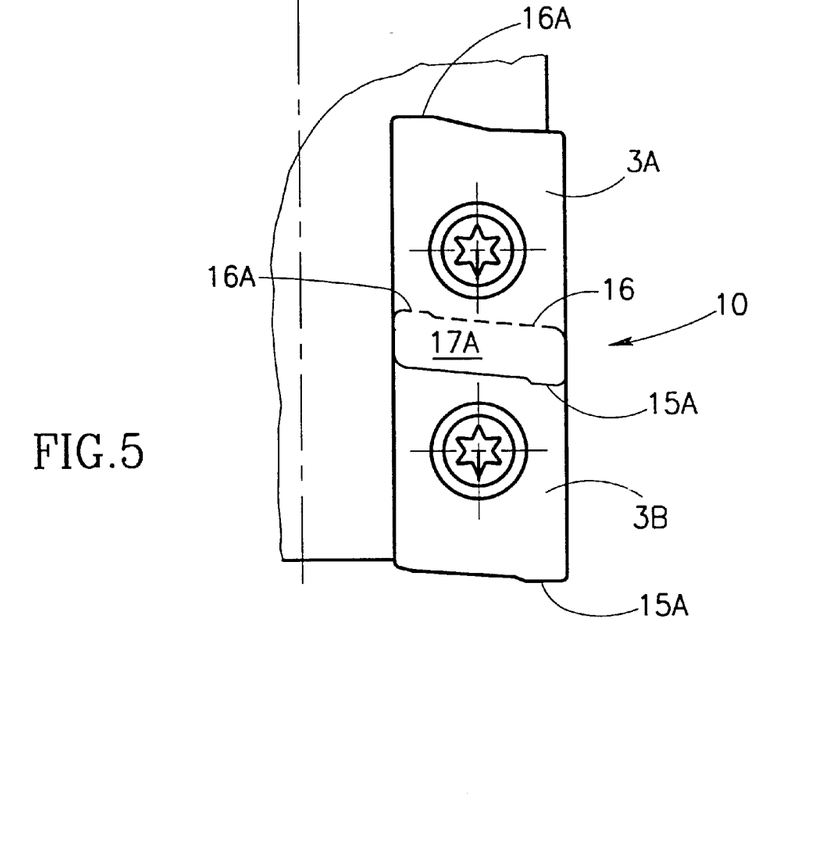
FIG. 5 is a close-up view of the adjacent cutting inserts of FIG. 4 superimposed in their top views.
Figure 6:
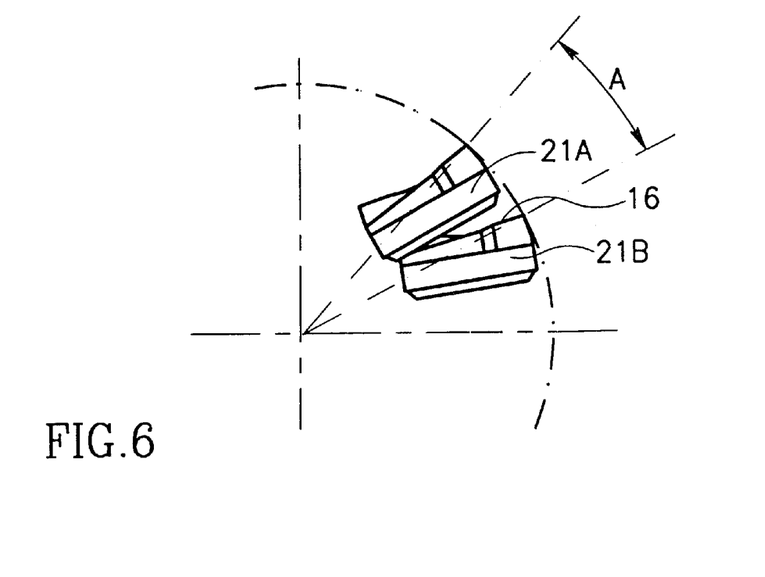
FIG. 6 is a close-up end view of the end mill of FIG. 3 showing a pair of adjacent cutting inserts of a second embodiment.
Figure 7:
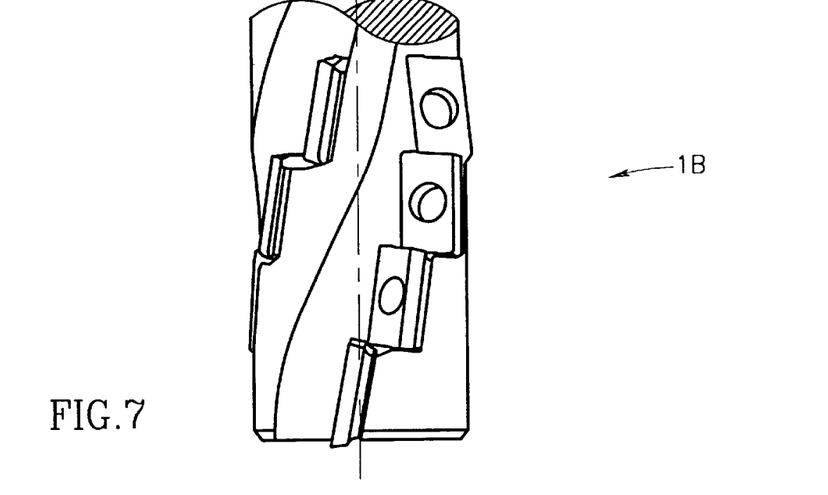
FIG. 7 is a side view of a right hand end mill of the present invention with cutting inserts stepping down along a right hand helix.
Figure 8:
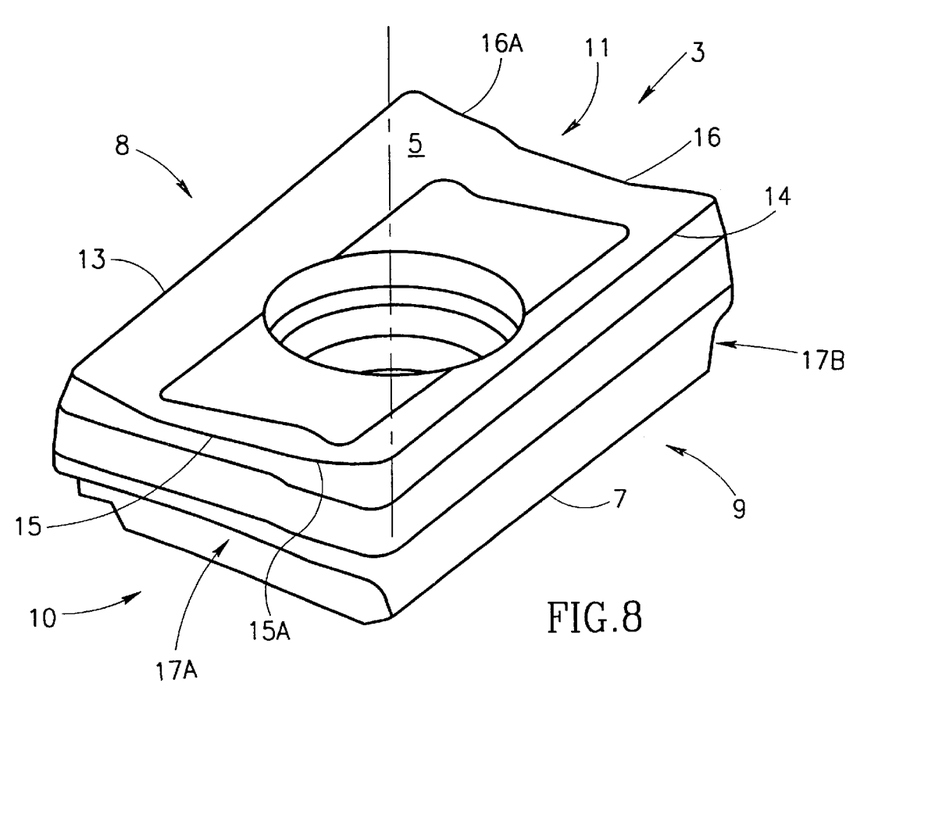
FIGS. 8–11 are respectively perspective, left side, bottom and front views of the first embodiment of cutting insert for use in the end mill of FIG. 3.
Figure 9:
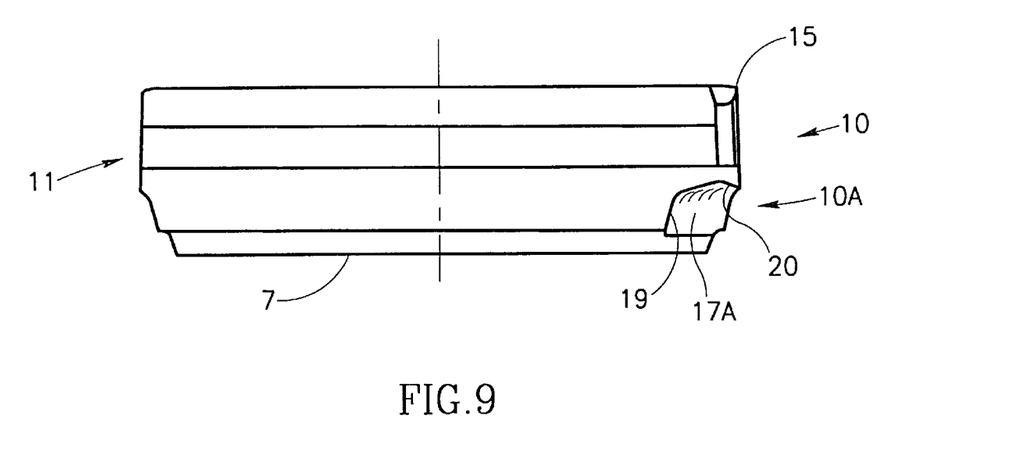

With reference to the drawings, FIGS. 3–6 show a right hand end mill 1A including a toolholder 2 for releasably receiving radially mounted, right hand milling cutting inserts 3 stepping up one or more left hand helixes each respectively defining a fully effective cutting edge during a cutting operation whilst FIG. 7 shows a right hand end mill 1B with cutting inserts stepping down a right hand helix. The toolholder 2 has a longitudinal axis L and the cutting inserts are mounted so as to have an axially directed operative cutting edge.

For use in the end mills 1A and 1B, FIGS. 8–12 show a cutting insert 3 of a generally rhomboidal shape and having an upper surface 5 that serves as a chip rake surface, a lower surface 7, a pair of opposite major side surfaces 8 and 9 and a pair of opposite minor side surfaces 10 and 11. The cutting insert 3 has a negative geometry for mounting in an insert receiving pocket in a dove-tail manner as described in commonly owned U.S. Pat. No. 5,622,460.

The cutting insert 3 has two major cutting edges 13 and 14 and two minor edges 15 and 16 formed respectively at the intersection of the major side surfaces 8 and 9 and minor side surfaces 10 and 11 with the upper surface 5. The two minor edges 15 and 16 are respectively formed with wipers 15A and 16A adjacent their associated major cutting edges 14 and 13.

Figure 10:
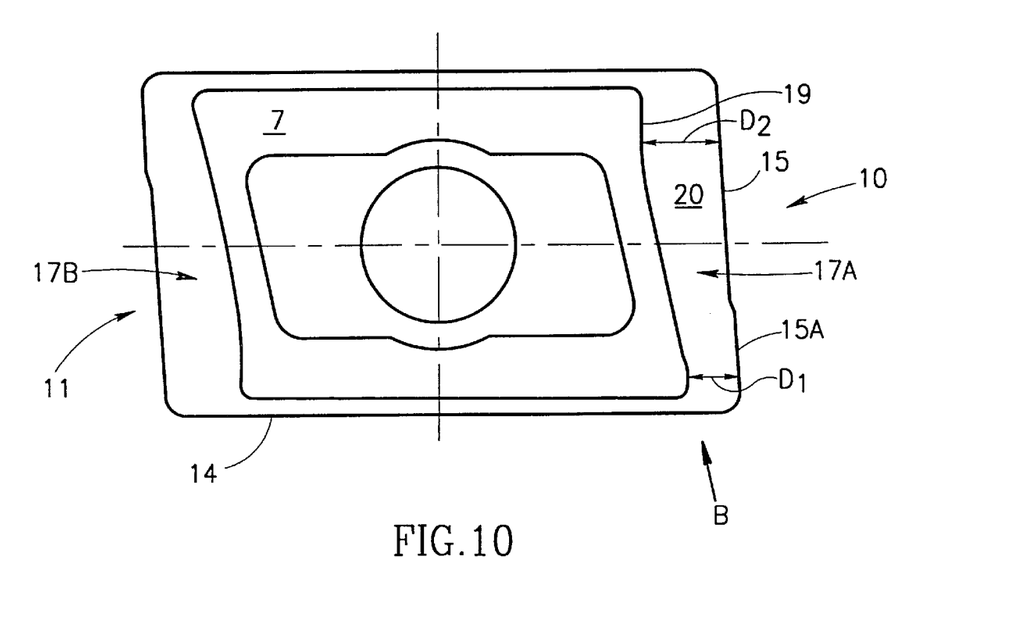
Figure 11:
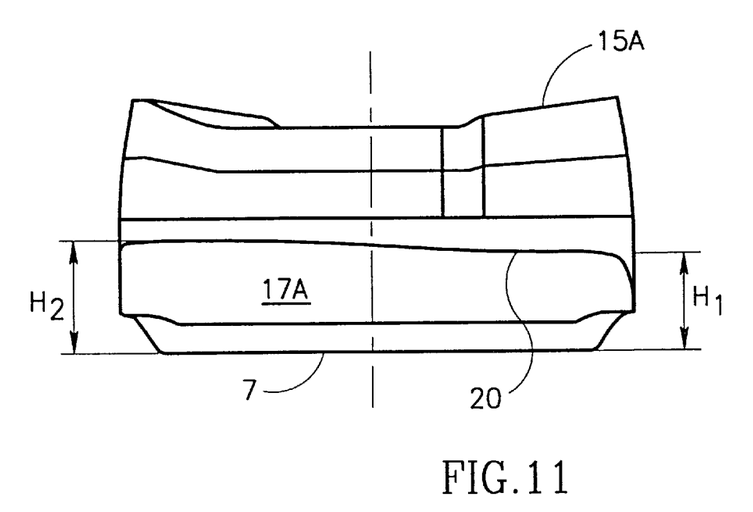
Figure 12:
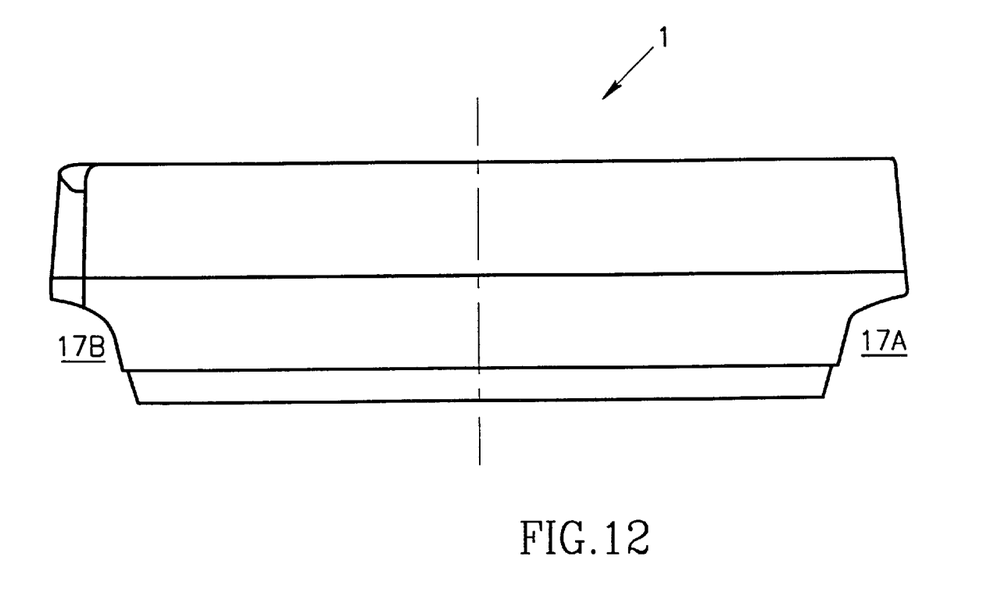
FIG. 12 is a side view of the cutting insert of FIGS. 8–11 along its recess side walls in a direction B shown in FIG. 10.

As shown in FIGS. 9–12, the minor side surface 10 has a lowermost portion 10A formed with a step-like recessed portion 17A delimited by a recess side wall 19 and a recess top wall 20. As shown in FIGS. 10 and 12, the minor side surface 11 has a recessed portion 17B similar to the recessed portion 17A.

As best seen in FIG. 10, the recess side wall 19 is of varying depth relative to the minor edge 15 along imaginary lines parallel to the major cutting edge 14 from a minimal distance $D_1$ proximal thereto, namely, underlying its associated wiper 15A, to a maximal distance $D_2$ at a point remote therefrom. As shown, the recessed portion 17A is effectively open ended remote from the cutting edge 14.

As best seen in FIG. 11, the height of the recess top wall 20 relative to the lower surface 7 increases from a minimal height $H_1$, proximal the major cutting edge 14, namely, underlying its associated wiper 15A, to a maximal height $H_2$ remote therefrom.

Figure 4:
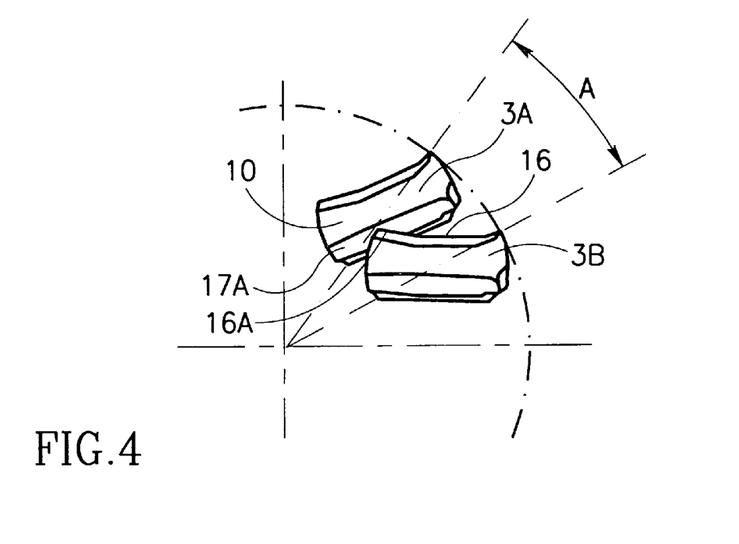
FIG. 4 is a close-up end view of the end mill of FIG. 3 showing a pair of adjacent cutting inserts of a first embodiment.

With reference now to FIGS. 4 and 5, a cutting insert 3A having a recess 17A formed in a lowermost portion 10A of its side surface 10 receives therein at least a wiper 16A of a radially directed insert edge 16 of its adjacent cutting insert 3B.

As mentioned hereinabove, this nesting provides for close packing of adjacent cutting inserts. For example, for end mills of similar diameter and adapted to receive inserts of, similar dimensions, Applicant's CMK-D40 according to the present invention has an insert to insert angular pitch A of 25° as opposed to a conventional Applicant's ADK-D40 which has an insert to insert angular pitch of 45°.

As mentioned hereinabove, this smaller angular pitch effectively brings the operative cutting edges of the cuttings inserts 3A and 3B closer to a true helix thereby providing for a quieter, continuous cutting.

Figure 13:
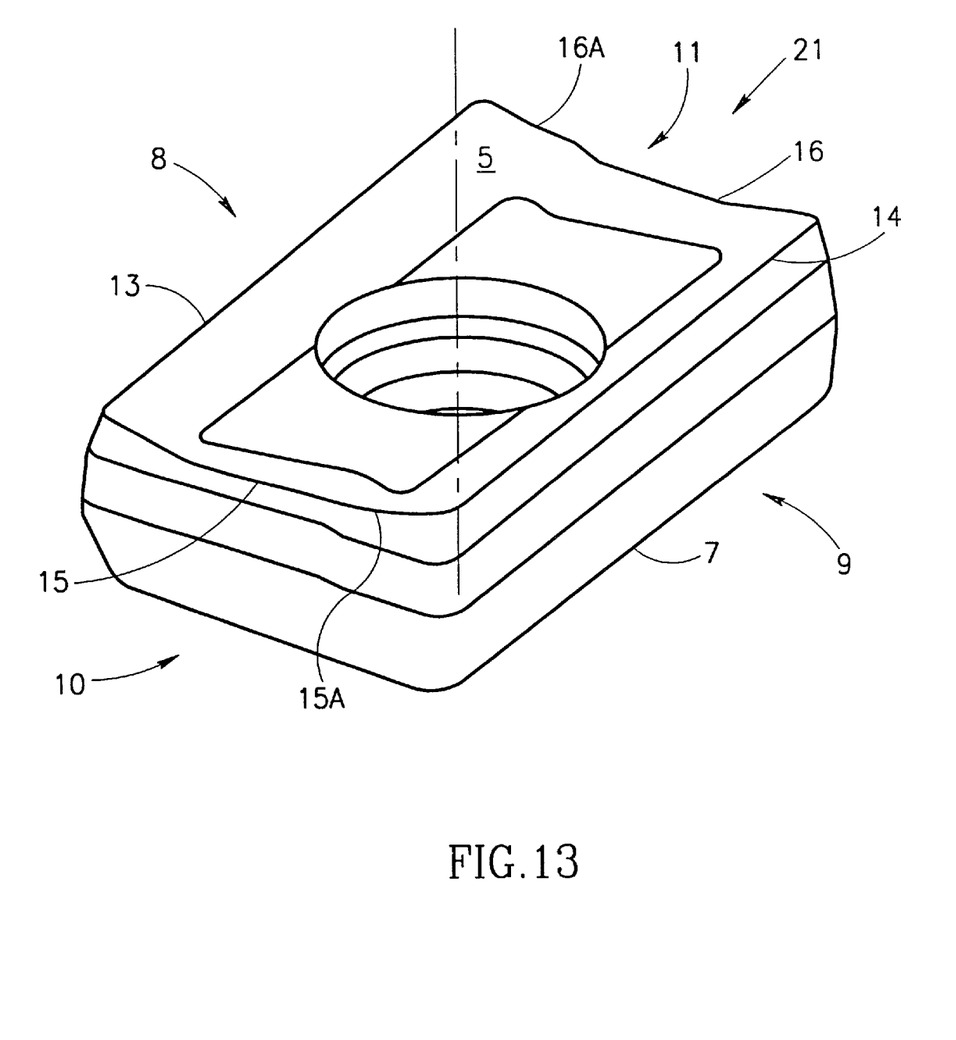
FIGS. 13 and 14 are respectively perspective and bottom views of the second embodiment of cutting insert for use in the end mill of FIG. 3.
Figure 14:
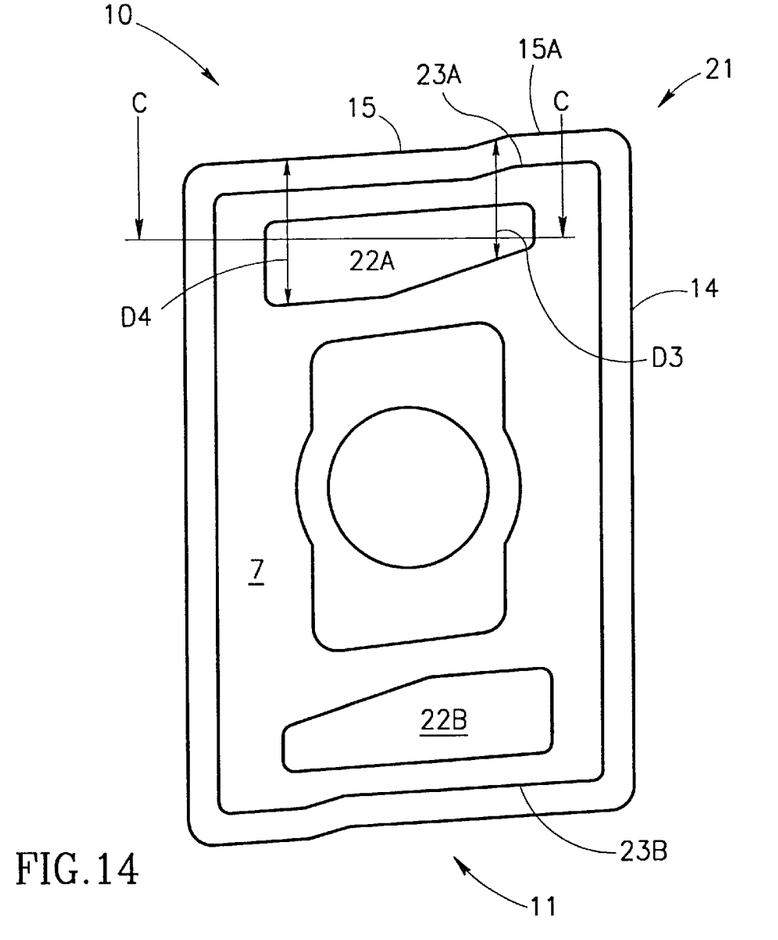

Turning now to FIG. 13, a cutting insert 21 is similar to a cutting insert 3 except for the recesses 17A and 17B and therefore its features are likewise numbered. As shown in FIG. 14, the cutting insert 21 differs from the cutting insert 3 in that its lower surface 7 is provided a pair of indentations 22A and 22B respectively formed adjacent bases edges 23A and 23B at the intersection between the lower surface 7 and the minor side surfaces 10 and 11.

Figure 15:
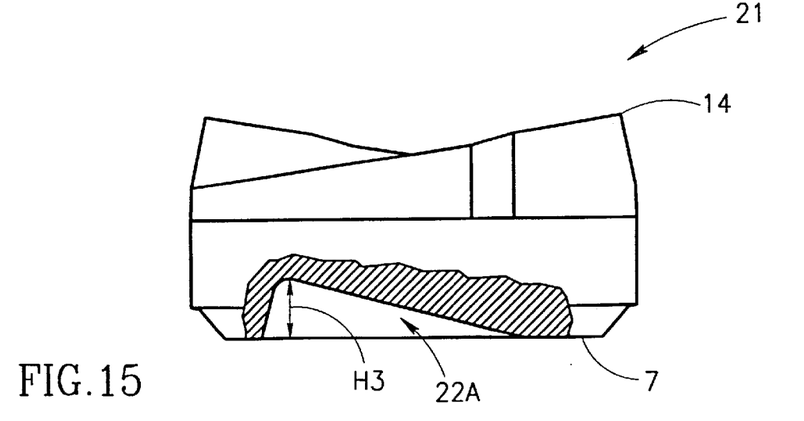
FIG. 15 is a cross section view of the cutting insert of FIGS. 13 and 14 along the line C—C in FIG. 14.

The indentations 22A and 22B are of a varying depth and height in a manner similar to the recessed portions 17A and 17B. Thus, on the one hand, the indentation 22A increases in depth relative to the minor edge 15 along imaginary lines parallel to the major cutting edge 14 from a minimal distance $D_3$ proximal thereto to a maximal distance $D_4$ at a point remote therefrom (see FIG. 14) and, on the other hand, it increases in height relative to the lower surface 7 from a minimal height proximal the major cutting edge 14 where it merges with the lower surface 7 to a maximal height $H_3$ at a point remote therefrom (see FIG. 15).

With reference now to FIG. 6, a cutting insert 21A having an indentation 22A formed in its lower surface 7 conceals therein a wiper 16A of a radially directed insert edge 16 of its adjacent cutting insert 21B.

While the invention has been described with respect to a limited number of embodiments, it will be appreciated that many variations, modifications and other applications of the invention can be made.

For example, the geometry of a recessed portion 17A can be modified, for example, it can be open or closed at one or both ends, within the constraints imposed by net-shape powder metallurgy manufacturing of cutting inserts or any other alternative process.

In addition, the cutting inserts can be of a generally square shape with four cutting edges and therefore provided with four recessed portions.

We claim:

1. A milling cutter comprising a toolholder having a longitudinal axis and at least two adjacent quadrilateral cutting inserts radially mounted therein, said cutting inserts having axially directed overlapping operative cutting edges which present an effectively continuous cutting edge, a first of said cutting inserts having a recessed portion arranged to receive therein a radially inward portion of an upper edge of a side surface of a second of said cutting inserts, with a radially outward portion of said upper edge being spaced apart from said recess, whereby an insert-to-insert angular pitch is reduced.

2. The milling cutter according to claim 1 wherein said recessed portion is formed only in a lowermost portion of said side surface of said first cutting insert.

3. The milling cutter according to claim 1 wherein said recessed portion has a varying depth, said depth having a maximal value at a point farthest from said operative cutting edge.

4. The milling cutter according to claim 1, wherein said recessed portion is open-ended, at least at a point farthest from said cutting edge.

5. The milling cutter according to claim 1, wherein said recessed portion has a maximal height at a point farthest from its associated operative cutting edge.

6. A quadrilateral cutting insert comprising
   an upper rake surface and a lower base surface with a throughgoing bore transversing therethrough;
   at least one side surface associated with a cutting edge of the insert and a pair of opposite side surfaces directed transversely thereto intersecting said upper rake surface at upper edges;
   at least one of said opposite side surfaces having a recessed portion of varying depth relative to its associated upper edge along imaginary lines parallel to said cutting edge in a bottom view of the cutting insert, said depth being maximal at a point farthest from said cutting edge.

7. The cutting insert according to claim 6 wherein said depth increases from a minimal depth proximal to said cutting edge to a maximal depth at a point farthest therefrom.

8. The cutting insert according to claim 7 wherein said recessed portion is open-ended at least at a point farthest from said cutting edge.

9. The cutting insert according to claim 6, wherein said recessed portion is of varying height relative to said lower surface in a front view of the cutting insert and whereby said height is maximal at a point farthest from said cutting edge.

10. The cutting insert according to claim 6 wherein said upper edges include a wiper portion adjacent said cutting edge.

11. A quadrilateral cutting insert comprising:

upper and lower surfaces, a first side surface associated with a first cutting edge and a pair of opposite side surfaces directed transversely to said first side surface, the insert having a first upper edge and a first base edge defined by the respective intersections of said upper and lower surfaces and a first of said pair of opposite side surfaces, said first of said pair of opposite side surfaces having a first recessed portion of varying depth relative to said first upper edge along imaginary lines parallel to said first cutting edge in a bottom view of the cutting insert, wherein;

the depth of said first recessed portion increases from a minimal value proximal to said first cutting edge to a maximal value at a point farthest therefrom.

12. The quadrilateral cutting insert of claim 11, further comprising a second side surface associated with a second cutting edge with said pair of opposite side surfaces also being directed transversely to said second side surface, the insert further having a second upper edge and a second base edge defined by the respective intersections of said upper and lower surfaces and a second of said pair of opposite side surface, said second of said pair of opposite side surfaces having a second recessed portion of varying depth relative to said second upper edge along imaginary lines parallel to said second cutting edge in a bottom view of the cutting insert.

13. The quadrilateral cutting insert of claim 12, wherein said first and second cutting edges are identical and the insert is indexable.

14. The quadrilateral cutting insert of claim 11, wherein said recessed portion is open-ended, at least at a point farthest from said first cutting edge.

15. A quadrilateral cutting insert comprising upper and lower surfaces, a first side surface associated with a first cutting edge and a pair of opposite side surfaces directed transversely to said first side surface, the insert having a first upper edge and a first base edge defined by the respective intersections of said upper and lower surfaces and a first of said pair of opposite side surface, said first of said pair of opposite side surfaces having a first recessed portion of varying depth relative to said first upper edge along imaginary lines parallel to said first cutting edge in a bottom view of the cutting insert, wherein;

said depth has a maximal value at a point farthest from said first cutting edge, and said first recessed portion is provided as a step-like feature in a lowermost portion of said first of said opposite side surfaces and is of varying height relative to said lower surface in a front view of the cutting insert and whereby said height is maximal at a point farthest from said first cutting edge.

16. A quadrilateral cutting insert comprising upper and lower surfaces, a first side surface associated with a first cutting edge and a pair of opposite side surfaces directed transversely to said first side surface, the insert having a first upper edge and a first base edge defined by the respective intersections of said upper and lower surfaces and a first of said pair of opposite side surface, said first of said pair of opposite side surfaces having a first recessed portion of varying depth relative to said first upper edge along imaginary lines parallel to said first cutting edge in a bottom view of the cutting insert, wherein;

said depth has a maximal value at a point farthest from said first cutting edge, and said first recessed portion is provided as an indentation in said lower surface and is of varying height in a transverse cross section view of the cutting insert passing through said first cutting edge and whereby said height is maximal at a point farthest from said first cutting edge.

17. A quadrilateral cutting insert comprising upper and lower surfaces, a first side surface associated with a first cutting edge and a pair of opposite side surfaces directed transversely to said first side surface, the insert having a first upper edge and a first base edge defined by the respective intersections of and upper and lower surfaces and a first of said pair of opposite side surface, said first of said pair of opposite side surfaces having a first recessed portion of varying depth relative to said first upper edge along imaginary lines parallel to said first cutting edge in a bottom view of the cutting insert, wherein;

said depth has a maximal value at a point farthest from said first cutting edge, and said first recessed portion is of varying height relative to said lower surface in a front view of the cutting insert and whereby said height is maximal at point farthest from said first cutting edge.

* * * * *